3,829,472
METHOD FOR THE SEPARATION OF METHALLYL SULFONATE

Heinz Rassaerts, Marl, Germany, assignor to Chemische Werke Huls Aktiengesellschaft, Marl, Germany
No Drawing. Filed Apr. 9, 1973, Ser. No. 349,429
Claims priority, application Germany, May 4, 1972, P 22 21 736.3
Int. Cl. C07c *143/16*
U.S. Cl. 260—513 B  3 Claims

ABSTRACT OF THE DISCLOSURE

A method for separating sodium methallyl sulfonate from sodium chloride water solution by partial evaporation of the brine to a weight ratio of about 1.3–1.5:1 of sodium methallyl sulfonate and sodium chloride salts to water, to precipitate the sodium chloride followed by cooling to separate the methallyl sulfonate.

BACKGROUND OF THE INVENTION

The field of the invention is acyclic sulfonic acids and the invention is particularly concerned with methallyl sulfonate salt production.

The state of the art of methallyl sulfonate salt production may be ascertained by reference to U.S. Pats. 2,601,256 of Bruson which issued June 24, 1952 and 3,453,320 of Robeson which issued July 1, 1969, and German Published Application DT–OS 1,804,135, the disclosures of which are incorporated herein.

An object of the invention is an improved method for the separation of sodium methallyl sulfonate from a mixture of methallyl sulfonate and sodium chloride in a water solution.

The large scale production of sodium methallyl sulfonate involves a reaction between methallyl chloride and sodium sulfite in an aqueous medium. In this reaction sodium methallyl sulfonate and sodium chloride are produced in an equimolecular ratio.

Sodium methallyl sulfonate must be separated from its byproduct, sodium chloride, before being used. There are a plurality of known methods for this separation. U.S. Pat. 2,601,256 of Bruson, which issued June 24, 1952, discloses evaporating the mixture to dryness followed by recrystallization of the dry salt mixture with ethanol whereby the undissolved sodium chloride remains behind. Since sodium methallyl sulfonate is only soluble to a limited extent in alcohol, many extractions involving a large amount of alcohol is necessitated in order to achieve a satisfactory yield. This method is not economical.

U.S. Pat. 3,453,320 discloses an improvement in the method of producing methallyl sulfonate salt wherein sodium sulfite and methallyl chloride are reacted in an aqueous medium having a ratio of sodium sulfite to methallyl chloride of 1.3:1 to 1.1:1, a water content of 47 to 48 percent by weight, the reaction mass is cooled to 8 to 15° C. to precipitate the sodium methallyl sulfonate and the mother liquor and sodium chloride are removed by a centrifuge.

According to the teachings of U.S. Pat. 3,453,320, suitable crystallization from a concentrated water phase yields 75–79 percent of the sodium methallyl sulfonate having a sodium chloride content of less than 1 percent by weight. The yield of this method cannot be increased without additional expenditure resulting from added extraction steps which are economically unfeasible.

German Published Application DT–OS 1,804,135 teaches crystallizing out a large portion of the methallyl sulfonate. The mother liquor is evaporated to dryness and the residual methallyl sulfonate is recovered by solvents such as formic acid or acetic acid from the salt mixture. After the step of evaporating to dryness with the concomitant necessity of grinding, the use of solvents such as formic acid and acetic acid is not advantageous because of the necessity of controlling the corrosion problem.

SUMMARY OF THE INVENTION

Having in mind the limitations of the prior art, the present invention solves the problem of extracting sodium methallyl sulfonate from equimolecular mixtures comprising sodium chloride in a technically simple and economical manner.

This object of the invention is achieved by the separation of sodium methallyl sulfonate from an equimolecular mixture of methallyl sulfonate and sodium chloride water solution characterized in that the solution is evaporated at about normal pressure until the weight ratio of the salts to water is 1.3–1.5:1 followed by removal of the crystallized sodium chloride at the evaporation temperature. The remaining solution is treated by adding 0.1–2 percent by weight water followed by cooling to precipitate pure sodium methallyl sulfonate by crystallization.

DESCRIPTION OF THE PREFERRED EMBODIMENTS

It has been found that, at the boiling point of the reaction solution, sodium chloride precipitates as practically pure sodium chloride following the evaporation step.

It is desirable to precipitate as much sodium chloride as possible in order to produce the most concentrated solution of methallyl sulfonate but at the same time not so great as to cause coprecipitation of the methallyl sulfonate. The weight ratio of methallyl sulfonate and sodium chloride salts of 1.3–1.5:1 water has proven satisfactory.

One computes the exact amount of water to be removed by evaporation by the ratio—gms. salts per 100 gms. of the reaction solution. In order to keep the evaporation cost down, one should keep the concentration of the reaction mixture of methallyl chloride and sodium sulfite as great as possible.

The solutions should be evaporated at about atmospheric pressure. Evaporation at a lower pressure reduces the evaporation temperature and the solubility of the methallyl sulfonate, which affects the economy of the process. A pressure which is too much in excess requires a pressure apparatus and at the higher temperatures, inherent in using higher pressures, presents a possibility of polymerization of methallyl sulfonate. It is, however, possible to evaporate the solution at a lower pressure at first and increase the pressure to atmospheric pressure towards the end of the evaporation taking care that no methallyl sulfonate crystallizes out of the solution.

The evaporation temperature of the sodium methallyl sulfonate and sodium chloride at atmospheric pressure and a weight ratio of salts to water of about 1.3–1.5:1 at which sodium chloride precipitates without precipitation of sodium methallyl sulfonate is suitably 108 to 113° C.

The precipitated sodium chloride is removed hot, i.e. at substantially the same temperature as the evaporation of the mother liquor. The separated sodium chloride contains a small amount of methallyl sulfate in the form of adhering mother liquor. This adhering liquor can be easily removed by washing with water which wash water may be recycled back into the evaporation step. After removal of the precipitated sodium chloride, the hot solution remaining is diluted with 0.1 to 2 percent by weight water based on the mother liquor in order to prevent further sodium chloride crystallization upon cooling. Advantageously condensation water from the evaporation step is used for this purpose so that a special provision of an outside source of water is not needed. In case this water is insufficient, addition water from the washing steps may be added. For this purpose no more than 2 percent by weight water should be added because additional water will decrease the methallyl sulfonate yield in the following crystallization step. After adding this water, the solution is cooled to crystallize the sodium methallyl sulfonate.

A temperature of about 8 to 50° C. is suitable with 15° C.–30° C. being preferred for the crystallization which in practice can easily be achieved by the use of cooling or vacuum crystallization without any necessity of additional cooling energy. One is, in any case, limited in obtaining the maximum methallyl sulfonate precipitate in one step because the cost of additional cooling to lower temperatures is economically limited. In any case, the lowest crystallization temperature is reached when the solubility of sodium chloride is exceeded and crystallization of sodium chloride, together with methallyl sulfonate, begins. Crystallization at a higher temperature produces only a lower methallyl sulfonate yield per method step so that a higher proportion of liquor must be recirculated.

All of the wash water and mother liquor used in the invention is either directly or indirectly returned to the methallyl sulfonate (MAS)-crystallization chamber in the evaporation step or serves as additional water as a reaction medium in the reaction of methallylchloride with sodium sulfite and in this manner is returned back to the evaporation step.

Another advantage of the invention resides in the fact that there is practically no loss of sodium methallyl sulfonate because all of the wash and mother liquor is re-used in the process. Furthermore, there is no step in the method in which the water-salt solution is evaporated to dryness with its attended evaporator discharge, conveying, grinding and extraction of the dried salt mixture which are all time consuming and costly. Further, it is to be noted that, except for the above-mentioned additional water, no foreign agents such as, e.g. acetic acid is introduced so as to cause a corrosion problem.

EXAMPLE 1

The apparatus consists of a cylindrical double mantel container of glass having 2,350 ml. capacity and 100 mm. inside diameter, which one one side is closed with a Teflon coated metal plate and on the other side with a 29 mm. male ground, tapered joint that can be connected to a vacuum pump. About ⅔ of the height of the container above the metal plate has a fused glass frit therein. The double mantel of the container can be heated by steam by a flexible hose connection. The method of separating the methallyl sulfonate from the sodium chloride water solution in the above-described apparatus is as follows: Hot water solution of methallyl sulfonate and sodium chloride are introduced into the glass container and weighed by difference in order to ascertain the amount of the solution in the container. Finally, the solution is heated by steam with the metal plate lowermost in order that the hot liquor must pass through the glass frit. Evaporation of the water was accelerated by reducing the pressure to 100 mm. Hg. The amount of evaporated water is easily determined by the difference in weight of the whole system. After reaching the desired weight ratio of salts to remaining solution, e.g. 1.3–1.5:1, the container is turned over so that the glass frit is above. A vacuum is connected after removal of the metal plate and by continuous heating, water vapor is drawn through the glass frit which is also heated to the evaporation temperature. Sodium chloride remains behind on the glass frit.

The crystallized sodium chloride can be easily removed from the metal plate. In this manner, it is impossible to have a substantial decrease in temperature at the sodium chloride filtration step. Conditional, undesired crystallization of the MAS is thereby avoided. The mother liquor after adding 1 percent by weight $H_2O$ is cooled to 15° C. over a period of six hours to precipitate the MAS as a crystalline mass. The MAS is then filtered over a glass suction filter.

The following Table 1 illustrates the results of evaporating under various conditions using 1,000 grams of solution having a composition of: 330 grams sodium methallyl sulfonate, 124 grams sodium chloride and 546 grams $H_2O$. The whole mixture was weighed and the excess water driven off.

TABLE I

| Experiment number | Introduced amount of solution (grams) | Ratio of salt:remaining water | After separation of NaCl, amount of $H_2O$ added (percent by weight) |
|---|---|---|---|
| 1 | 1,000 | 1.24 | 1 |
| 2 | 1,000 | 1.31 | 1 |
| 3 | 1,000 | 1.39 | 1 |
| 4 | 1,000 | 1.48 | 1 |
| 5 for comparison | 1,000 | 1.58 | 1 |
| 6 for comparison | 1,000 | 1.24 | 0 |
| 7 for comparison | 1,000 | 1.31 | 0 |

| | Sodium methallyl sulfonate crystallized (15° C.) | | | | | | | | |
|---|---|---|---|---|---|---|---|---|---|
| | Not washed | | Washed 1 time with ice water | | Washed 2 times with ice water (each 20 g.) | | Mother liquor | | |
| Experiment number | Dry (grams) | Percent methallyl sulfonate | Dry (grams) | Percent methallyl sulfonate | Dry (grams) | Percent methallyl sulfonate | Amount (grams) | NaCl (percent) | Methallyl solfonate (percent) |
| 1 | 169.6 | 96.3 | | | | | 550.5 | 11.6 | 26.9 |
| 2 | 195.2 | 96.4 | | | | | 493.6 | 11.5 | 22.7 |
| 3 | 209.3 | 96.1 | ¹190.2 | 20 g. ice water, 97.8 | 172 | 98.9 | 448.8 | 12.3 | 22.6 |
| 3a | | | ¹155.3 | 50 g. ice water, 98.5 | | | | | |
| 4 | 189.8 | 96.9 | | | | | 455.7 | 11.7 | 25.7 |
| 5 | 208.6 | 93.2 | | | | | 334.9 | 10.2 | 30.7 |
| 6 | 190.5 | 90.1 | | | | | 523.7 | 9.1 | 29.2 |
| 7 | 231.5 | 86.3 | | | | | 446.7 | 6.9 | 27.8 |

¹ Approximately.

Depending upon the requirements, the invention can be either carried out continuously or on a batch basis.

The sodium methallyl sulfonate yield of the present invention is about 98.0 to 99.8 percent by weight.

The following specific examples show preferred methods of carrying out the invention, comparisons with the prior art and the new and unexpected results over the prior art.

EXAMPLE II

The following illustrates details of a continuous recirculating operation of the method where a simulated recirculation is employed only for simplification. Example I was not altered for this purpose.

A solution of 1,000 grams, having the following analysis: 305 gm. sodium methallyl sulfonate, 125 gm. sodium chloride and 570 gm. water was evaporated until the total salt water ratio was 1.40 which consists of 58 percent by weight of MAS+NaCl. The crystallized sodium chloride was filtered at the evaporation temperature after crystallization has taken place. The crystalline salts consisted of 63 grams of sodium chloride, 10 grams of sodium methallyl sulfonate and 7 grams of water. The filtrate was cooled over several hours to 15° C. after adding 6 grams H$_2$O whereby pure crystalline MAS precipitated from the solution. Moist MAS consisting of 221 grams crystalline MAS, including 40 grams water and 7 grams sodium chloride was recovered. The remaining 445 grams of mother liquor having 55 grams of NaCl and 121 grams MAS was combined with 555 grams of fresh reaction mixture prepared by the reaction of methallyl chloride and sodium sulfite in a water solution. The composition of this fresh reaction mixture was 33 percent by weight MAS and 12.5 percent by weight NaCl so that 1,000 grams of the resulting solution comprised 305 grams MAS, 125 grams sodium chloride and 570 grams of water. Under these conditions the yield of MAS was 94.6 percent by weight. Through suitable filtration or separating methods for separating the crystalline NaCl from the mother liquor and washing the crystalline cake, the yield of MAS was further increased.

EXAMPLE III

The following example illustrates the relationship of the continuous method of Example II by using the mother liquor as a reaction medium in the reaction of methallyl chloride and sodium sulfite.

In a 2 liter stirred reactor provided with thermometer and drop funnel under strong stirring, 445 grams of mother liquor, (121 grams sodium methahyl sulfonate and 55 grams sodium chloride) and 305 grams of water were introduced and at a temperature of 30–33° C., in addition, 147 grams of sodium sulfite was added. During a period of 2 hours, 150 grams of methallyl chloride was added drop-wise whereby the temperature increased to the boiling point (65° C.) of the azetotrope of methallyl chloride and water by the resulting exothermic reaction which occurred immediately upon adding the methallyl chloride. Toward the end of the reaction, the solution was kept under continuously slow boiling by adding heat. The low solubility of methallyl chloride in water necessitated strong agitation during the reaction. After complete introduction of the methallyl chloride, the reaction mixture was stirred for an additional hour whereby the yield could be monitored by water phase chloride monitoring. The excess methallyl chloride was distilled off immediately upon completion of the reaction of the sodium sulfite. The final sodium methallyl sulfonate solution contains 570 grams H$_2$O, 305 grams sodium methallyl sulfonate, and 125 grams sodium chloride which solution corresponds to the mixture of the mother liquor and fresh reaction solution of Example II.

EXAMPLE IV

The following example illustrates the relationship of methallyl sulfonate production in ton quantities by the discontinuous method:

In a 3 cubic meter capacity reaction container, fitted with a stirring mechanism or circulating pump, and adapted for distillation, was 2,640 kg. of 24 percent sodium sulfite solution introduced. The temperature was increased to about 60° C. and 500 kg. of methallyl chloride was added over a five hour period while strongly stirring and recirculating the mixture. After an additional five hours, the conversion of the sulfite was practically complete. Execess methallyl chloride was carefully distilled from the reaction and water was evaporated until the salt water ratio of the hot sodium chloride mother liquor was about 1.40. The temperature increased during the distillation from 108° C. to 112° C. The crystalline mass including the liquid was filtered by pumping through heated pipes and heated funnel at the evaporation temperature. About 130 kg. of solid sodium chloride (= to 44 percent of the total salt solution) having a methallyl sulfonate content of only 1 percent remained on the filter. The filtrate was added to about 1,400 kg. of the mother liquor, (23.5 percent by weight MAS=saturation). In addition, 165 kg. of wash water, 15 percent by weight MAS) was also added to the mixture. [The saturation value of an aqueous solution of MAS is about 38 percent by weight at 0° C.] This mixture is then pumped into a crystallization chamber. It is especially advantageous to use the crystal cake wash water as an additive for the mother liquor. The addition of the mother liquor with respect to methallyl sulfonate crystallization serves to permit efficient conveying and pumping of the mixture so that satisfactory operation of the centrifuge can be guaranteed. A crystal size of about 0.2–2 mm., produced by cooling the crystallization solution during 24 hours to 30° C., permitted satisfactory operation of the centrifuge. The centrifuged methallyl sulfonate was washed one time with 24 percent by weight ice water. The dried white crystalline methallyl sulfonate finally contained 0.3 percent by weight sodium chloride. The yield per cycle is in spite of the washing about 54 percent, (54 percent=430 kg. methallyl sulfonate) of the originally provided methallyl sulfonate crystallization solution.

A portion of the mother liquor was stored in a container for the next batch whereby with the addition of calcium chloride, the sulfate ion, unavoidably present in the sulfite solution, is precipitated as calcium sulfate and separated by filtration. This step is necessary since the recirculation of the mother liquor would otherwise cause a buildup of sodium sulfate resulting in precipitation with the methallyl sulfonate. The other portion of them other liquor was mixed together with fresh reaction solution and by evaporation reduced to the necessary concentration to be re-used in the process. The yield of methallyl sulfonate in this example was 99.6 percent by weight.

I claim:
1. In the process for the preparation of sodium methallyl sulfonate by reaction in aqueous solution of sodium sulfite with methallyl chloride to form said sodium methallyl sulfonate and sodium chloride in mother liquor, the improvement comprising:
    (a) evaporating said mother liquor at about atmospheric pressure to a weight ratio of sodium methallyl sulfonate and sodium chloride to water of about 1.3–1.5:1 to precipitate said sodium chloride;
    (b) removing said precipitated sodium chloride to produce substantially sodium chloride free mother liquor;
    (c) adding about 0.1 to 2 percent by weight water to said substantially sodium chloride free mother liquor to produce a sodium methallyl sulfonate solution; and
    (d) cooling said sodium methallyl sulfonate solution to a temperature of about 8 to 50° C. to precipitate said sodium methallyl sulfonate.
2. The process of Claim 1, wherein said cooling temperature of step (d) is 15–30° C.
3. A continuous process for the preparation of sodium methallyl sulfonate by reacting an aqueous solution of sodium sulfite with methallyl chloride to form said sodium methallyl sulfonate and sodium chloride in mother liquor, the improvement comprising:
    (a) evaporating said mother liquor at about atmospheric pressure to a weight ratio of sodium methallyl sulfonate and sodium chloride to water of about 1.3–1.5:1 to precipitate said sodium chloride;
    (b) removing said precipitated sodium chloride to produce substantially sodium cholide free mother liquor;
    (c) adding about 0.1 to 2 percent by weight water to said substantially sodium chloride free mother liquor to produce a sodium methallyl sulfonate solution;

(d) cooling said sodium methallyl sulfonate solution to a temperature of about 8 to 15° C. to precipitate said sodium methallyl sulfonate;
(e) removing said precipitated sodium methallyl sulfonate to produce substantially sodium chloride free and sodium methallyl sulfonate free mother liquor; and
(f) recirculating said substantially sodium chloride free and sodium methallyl sulfonate free mother liquor with the addition of sodium sulfite, methallyl chloride and water to form said aqueous solution.

References Cited

UNITED STATES PATENTS

| | | | |
|---|---|---|---|
| 3,453,320 | 7/1969 | Robeson | 260—513 B |
| 2,601,256 | 6/1952 | Bruson | 260—79.3 |

FOREIGN PATENTS

| | | | |
|---|---|---|---|
| 13,135 | 7/1966 | Japan | 260—513 B |
| 24,774 | 10/1965 | Japan | 260—513 B |
| 17,207 | 9/1966 | Japan | 260—513 B |

BERNARD HELFIN, Primary Examiner

N. CHAN, Assistant Examiner